INVENTOR.
Wendell P. Cropper
BY
*William Jolff*
ATTORNEY

Aug. 5, 1969　　　W. P. CROPPER　　　3,459,947
RADIATION SENSITIVE APPARATUS FOR ANALYZING GAS
Filed July 17, 1968　　　　　　　　　　　3 Sheets-Sheet 3

INVENTOR.
Wendell P. Cropper
BY
William Lohff
ATTORNEY

United States Patent Office 3,459,947
Patented Aug. 5, 1969

3,459,947
RADIATION SENSITIVE APPARATUS FOR
ANALYZING GAS
Wendell P. Cropper, Olympia Fields, Ill., assignor to Standard Oil Company, Chicago, Ill., a corporation of Indiana
Continuation-in-part of application Ser. No. 468,750, July 1, 1965. This application July 17, 1968, Ser. No. 745,395
Int. Cl. G01n 21/26, 21/22; B01d 53/00
U.S. Cl. 250—218                       18 Claims

ABSTRACT OF THE DISCLOSURE

A method and apparatus for determining the concentration of solid particulate matter suspended in a carrier gas where the carrier gas is contacted with water to scrub the solid particulate matter from the gas to form an aqueous suspension thereof. The amount of light transmitted through a sample of the aqueous suspension is then compared with the amount of light transmitted through an identical sample of pure water. The difference in light transmission is a measure of the amount of solid particulate matter in the aqueous suspension. The concentration of solid particulate matter in the carrier gas can then be determined from the quantity of gas contacted with the water.

CROSS-REFERENCE TO RELATED APPLICATION

This application is a continuation-in-part of application Ser. No. 468,750, filed July 1, 1965, now abandoned.

BACKGROUND OF THE INVENTION

There has long been a need for a method for the continuous, reliable and accurate measurement of solid particulate material in carrier gases. Especially today with concern over air pollution, the importance of measuring the quantity of dust particles in air makes this need even more significant. A wide variety of uses exists for an apparatus which performs such a function. One important application of such an instrument would be the determination of explosive concentrations of flour in a flour mill or coal dust in a coal mine. Specific to the petroleum industry, there is a need for an instrument which can continuously measure the loss of catalyst from the regenerator stacks of fluid catalytic cracking units.

I have developed an apparatus which conveniently performs the function of measuring the concentration of solid particulate matter in a carrier gas. By solid particulate matter, I mean any particle capable of being suspended in a body of gas. Solid particulate matter should be broadly construed herein to include particles having a diameter of less than about 100 microns. The actual particle size is unimportant. Specifically, I include within the meaning of solid particulate matter such items as dust, flour, coal dust, soot, ash, cement, sand, fine particles, etc. Basically, my definition of solid particulate matter is limited only to the requirement that the solid be finely divided, capable of suspension in a gaseous carrier, and essentially insoluble in water.

Most of the description contained herein will refer to a method and apparatus for measuring the rate of loss of catalyst from the stack gas of a fluid catalytic cracking unit regenerator. This is merely for the sake of convenience and in all cases it should be borne in mind that my invention is much broader in scope and is not limited to any application stated herein.

As to the use of my invention in the measurement of catalyst loss, it can easily be seen that such data would be most desirable. The measurement of the catalyst loss would readily detect such mechanical difficulties as holing-through of FCU cyclones and thus indicate excessive loss. The measurement of catalyst stack loss will also provide a warning of high air velocities which normally accompany coke buildup and thereby guide cutbacks in throughput to avoid flooding of the cyclones.

Previous measurements of catalyst losses were not entirely satisfactory. Such measurements were obtained through the use of an optical monitoring device which projected a beam of light through the stack to a sensing element. Other measurements were obtained through the use of instruments attached to the stack which measured the light scattered by catalyst particles. These devices have not always been entirely practical because of obstructions such as supporting members in the stack and because of the action of the gas stream on the optical system.

SUMMARY OF THE INVENTION

In accordance with the invention, I have discovered a method and apparatus for continuously and reliably determining the concentration of solid particulate matter suspended in a carrier gas. In a specific application, I have discovered a method and apparatus for continuously and reliably determining the catalyst loss in the stack gas from a regenerator in a fluid catalytic conversion unit. In the method, a sample of the carrier gas is taken from the total volume of gas and the catalyst particles in the sample are removed by scrubbing the gas sample with water. The water, containing the suspended particles, flows through an optical cell which measures the turbidity of the water. The turbidity reading is proportional to the concentration of solid particulate matter (suspended particles) in the water. At constant water and gas rates, the turbidity reading is, therefore, proportional to the concentration of solid particulate matter in the carrier gas. Applying this method to determining the catalyst loss rate from the regenerator stack gas, the instantaneous catalyst loss rate can be determined from the concentration of catalyst in the gas. The catalyst loss rate is the product of the catalyst concentration and the total gas rate in the stack. It has been found that the particle size of catalyst in the stack gas varies, but is principally below about 20 microns and that of the catalyst in the regenerator is an average of about 40 microns.

Briefly, the invention is directed to a method of continuously determining the concentration of solid particulate matter in a carrier gas. The method comprises taking a sample at a constant rate from the carrier gas and contacting the sample with water at a second constant rate to separate the particles from the gas sample and to produce an aqueous suspension, passing a light through the aqueous suspension and detecting the amount of light received, comparing the amount of light received through the aqueous suspension with a value for light received through water without the solid particulate matter to provide a measure of the amount of solid particulate matter in the carrier gas sample. When the method is applied to determining the rate of loss of solid particulate matter from a fluidized bed processing unit (such as in the case of catalyst loss from the stack of a FCU), such loss may be calculated from a relationship between the size of the sample taken and the main stream of gas. My method advantageously includes the periodic and automatic redetermination of the amount of light received through water without solid particulate matter to improve the accuracy in the comparison. The invention is also directed to an apparatus which utilizes the above-described method.

DETAILED DESCRIPTION AND PREFERRED EMBODIMENT OF THE INVENTION

Figure 1:
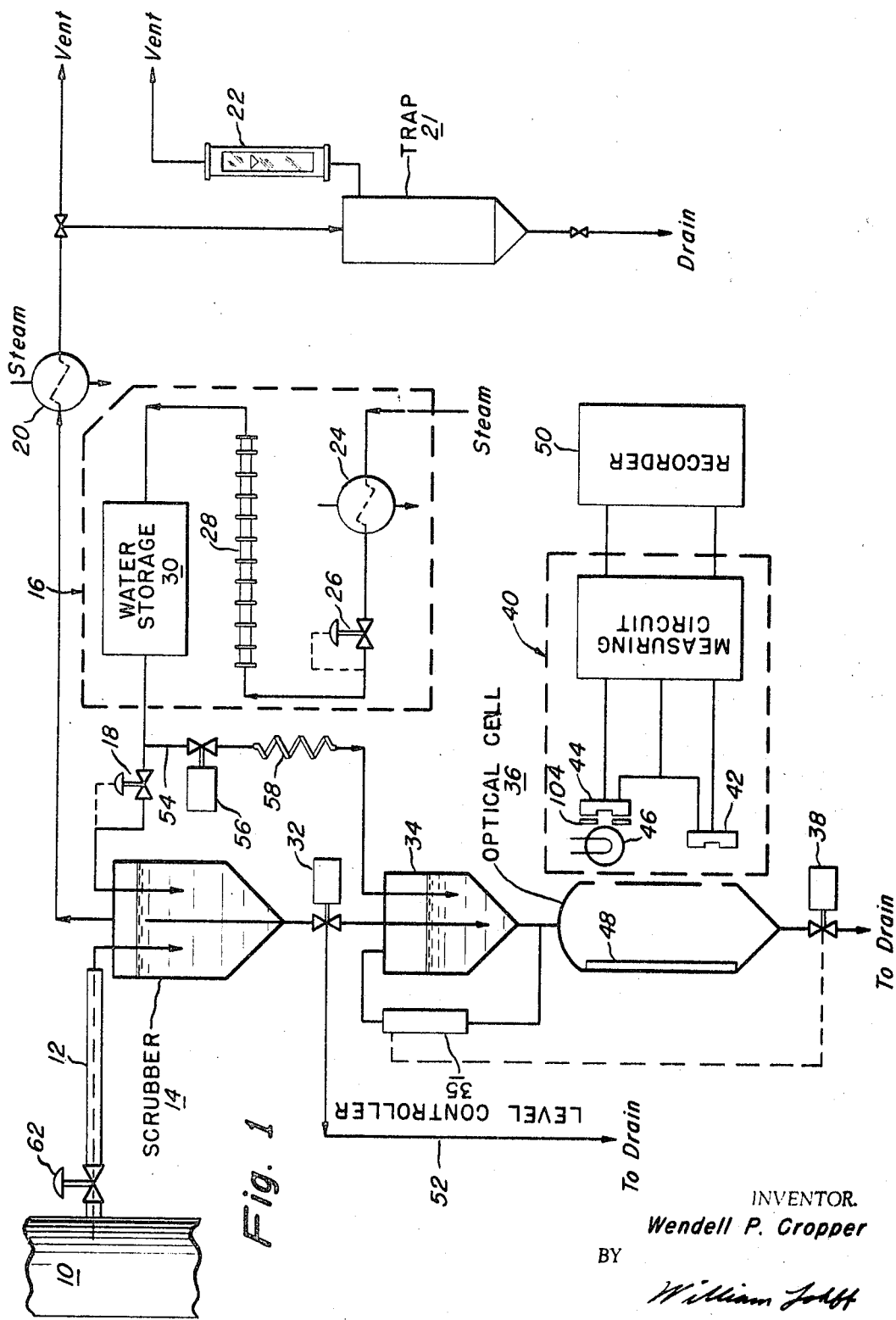
FIGURE 1 is a simplified schematic diagram of an illustrative apparatus showing the withdrawal of the sample of carrier gas through a sampling probe and into a scrubber for washing. An acqueous suspension from the scrubber flows to a reservoir equipped with a level controller and to an optical cell for the measurement of the catalyst in the suspension.

In FIGURE 1 stack gas is being removed through stack 10. Sample probe 12 is connected to stack 10 and to scrubber 14. For best results, the gas velocity in the probe should correspond to the gas velocity in the stack. A water source 16 is also connected through a water flow regulator 18 to scrubber 14 for providing water at a constant rate to scrubber 14.

The catalyst particles in the gas sample from sample probe 12 are removed by washing with water. The washed gas is vented from scrubber 14 through steam traced vent line or through trap 21 to rotameter 22, after which it is discharged to the atmosphere through a suitable vent line (not shown). The rotameter 22 serves to measure the gas rate and is used only for checking gas rate.

As will be understood more completely from the following description, water which is color-free and contains no sediments or dissolved gases is required in the operation of the apparatus. Advantageously, the water is substantially pure and can be obtained by condensing steam in condenser 24 using either 100 p.s.i. steam or low pressure steam. The condensed steam is then passed through pressure regulator 26 and through finned tubing 28 in which the cooling of the condensate to about 120° F. can be achieved when 12 to 15 feet of finned tubing is provided. The condensate from the finned tubing 28 is then passed into water storage 30. The pressure in the water storage is regulated at about 30 p.s.i. by means of pressure regulator 26. Water flows to scrubber 14 under constant pressure at a rate set by water flow regulator 18. Suitably, the water rate is about 500 cc./min. or 65 pounds per hour. The acqueous suspension from scrubber 14 containing the catalyst particles flows downward through three-way valve 32 to reservoir 34 which is provided with liquid level controller 35. The aqueous suspension passes through reservoir 34 into optical cell 36. The use of reservoir 34 and level controller 35 assures that optical cell 36 is always liquid-full. The level controller operates a soenoid valve 38 at the bottom of cell 36 for discharge of liquid from the cell. Alternatively, a vented siphon can be used for control of liquid level in the reservoir.

The turbidity of the water is determined by photocell bridge 40 utilizing two barrier-type photocells 42 and 44. Photocell 44 provides a standard or reference signal and is positioned so that the light from the light means or lamp 46 falls directly upon the sensitive surface of photocell 44. Photocell 42 is activated by light passing through the aqueous suspension in cell 36 which is provided with mirror 48 to increase the path of the light. The output of the measuring photocell depend upon the degree of obscuration of light passing through the cell by the catalyst particles contained in the water. The net photocell signal is a measure of the turbidity of the suspension, and is recorded on recorder 50 as an indication of the changes in concentration of catalyst in the stack gas. The recorder can be located in the control room, several hundred feet from the instrument, if desired.

Advantageously, the instrument is automatically standardized after periods of use of about eight hours. During standardization, the stack gas continues to flow to scrubber 14 but the aqueous suspension is by-passed around optical cell 36 by means of the three-way valve 32. The means for by-passing optical cell 36 is illustrative by line 52. Pure water is then admitted by means of line 54 containing solenoid valve 56 and flow restrictor 58 to reservoir 34 and to optical cell 36 at a rate of about 300 cc./min.

The pure water flows through cell 36 for about fifteen to twenty minutes to flush out residual suspended material. At the end of the twenty minute interval when cell 36 is filled with pure water, the apparatus is automatically standardized. The standardization circiut detects the deviation of the recorder pen from the base line and makes a correction if the deviation is greater than about one percent of full scale. Changes in cell optics such as photocell aging, clouding of windows or mirrors, or changes in the electrical components of the measuring circuit are compensated for by the automatic standardization circuit. Sensitivity and range of the apparatus are not affected by automatic base line correction. Following correction for base line, flow of pure water to cell 36 is shut off and the three-way solenoid valve 32 permits the aqueous suspension to flow through reservoir 34 into cell 36.

Advantageously, a controller provides the means for automatically switching the apparatus between run and standardize functions. Conveniently, the controler contains a cam-switch program timer and power supplies for the operation of the apparatus. Advantageously, the controller also includes a safety circuit, activated by a thermocouple in the optical cell. This circuit protects the cell against high temperatures. If cell temperature rises above 150° F., the flow is by-passed around the cell to prevent damage to the cell. The apparatus will remain in this standby mode until reset manually.

Figure 2:
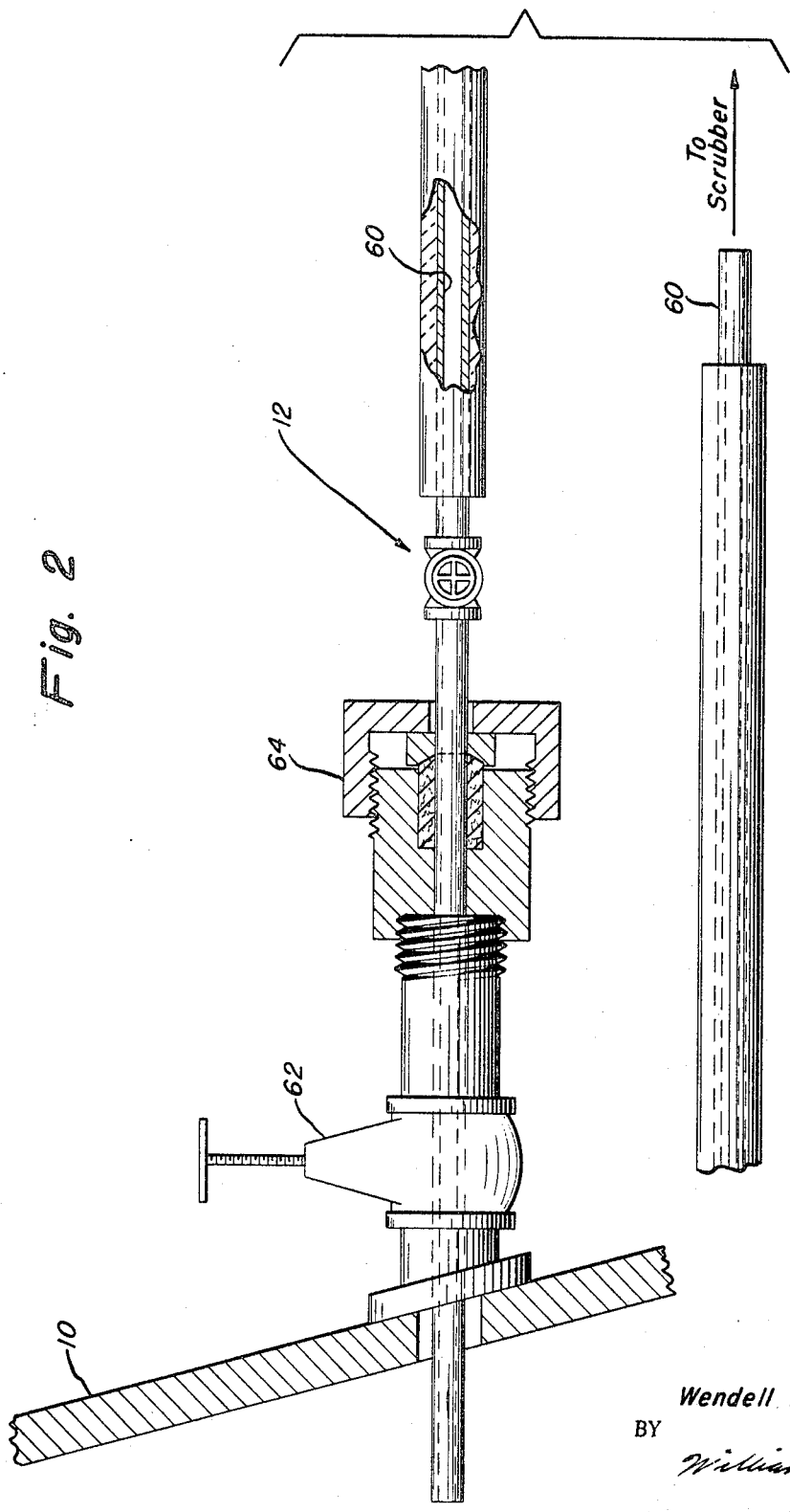
FIGURE 2 shows the details of an illustrative probe for removing samples of carrier gas.

In FIGURE 2 the details of assembly probe 12 are shown. The probe 12 is connected to stack 10. Conveniently, an opening into stack 10 should be available at a point near the apparatus location to avoid excessively long sample piping.

Suitably, the probe is a piece of type 304 stainless steel tubing 60, 0.5 inch I.D. x 0.109 inch wall thickness, about six feet long, and cold-drawn for extra mechanical strength. Gate valve 62 and packing gland 64 facilitate insertion and removal of probe 12. Asbestos tape is used as a sealant in the packing gland 64, rather than Teflon or lava sealants. Catalyst impacted between the sealant and the probe will usually make withdrawal of the probe difficult if the latter type of sealants are used.

Figure 3:
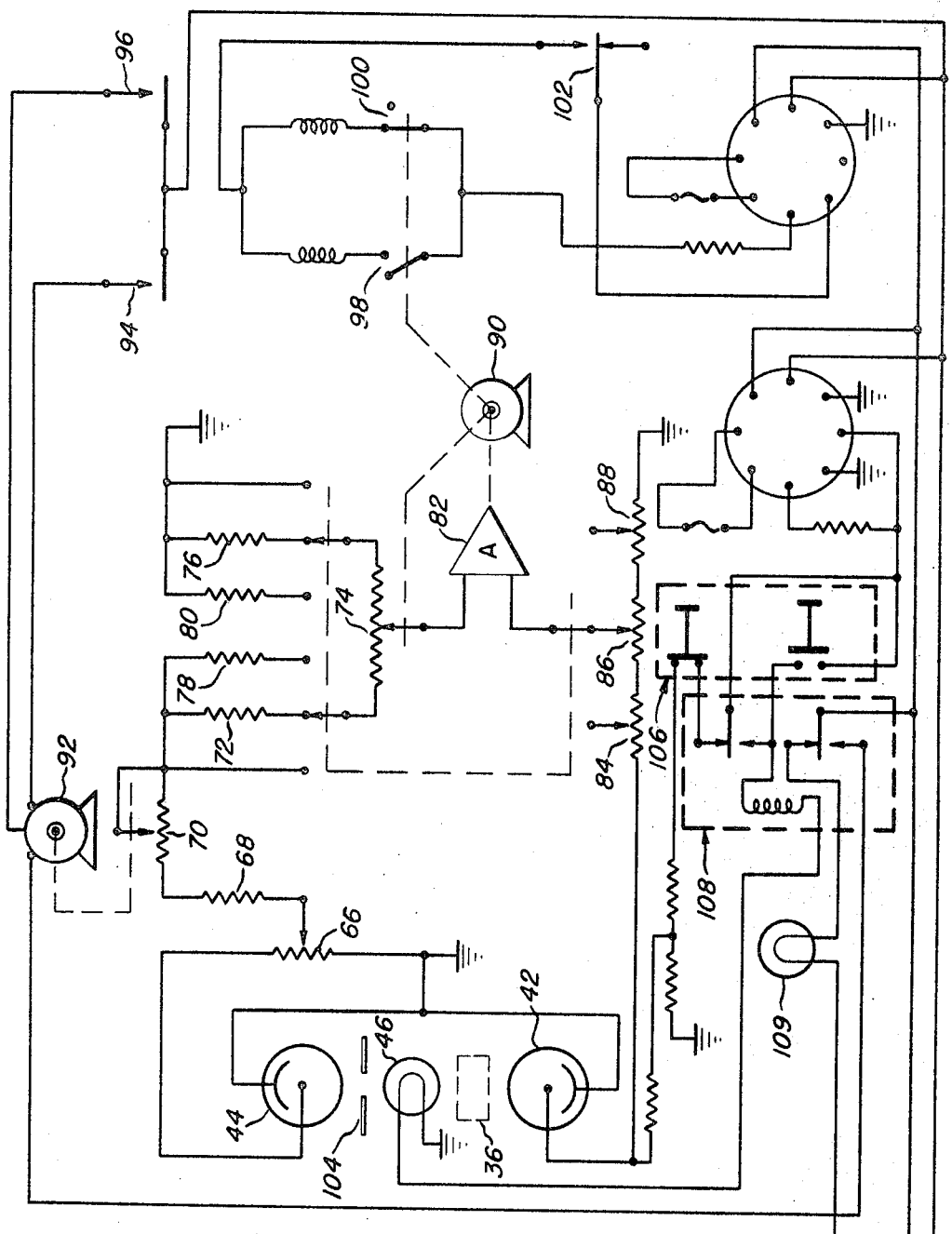
FIGURE 3 is a schematic diagram of the electrical measuring circuit for apparatus of FIGURE 1.

FIGURE 3 shows an illustrative measuring circuit for FIGURE 1 with optical cell 36, photocells 42 and 44, and light source 46. In the operation of the circuit, the output voltage generated by photocell 44 appears across potentiometer 66. A portion of the output, available at the slider of potentiometer 66, is fed to the resistive network consisting of fixed resistor 68, variable resistor 70 and resistors 72, 74, and 76. Potentiometer 66 is used to adjust the reference voltage impressed across slidewire 74 to the approximately correct value. One imput to the Brown servo-amplifier 82 is derived from the slider of resistor 74. The other input is derived from the slider of one of the variable resistors (i.e. 86) connected in the load circuit of measuring photocell 42. At balance, the signal voltage developed at the slider of resistor 86 will be equal to the reference voltage available at the slider on the Brown slidewire 74. This position of the slider on resistor 74 will correspond to some position of the recorder pen. If the intensity of light received by photocell 42 should then change, a voltage signal will appear at the input of servo-amplifier 82 causing the associated servo-motor 90 to reposition the slider of resistor 74 and rebalance the bridge. In this circuit, range resistors are advantageously selected so that recorder readings on the three ranges are approximately in the ratio of 3:2:1 for ranges 1, 2, 3, respectively.

Automatic standardization is accomplished by means of potentiometer 70 which is driven by motor 92. Motor 92 is a reversible motor, mounted on the recorder chassis, and is controlled by relays 94 and 96, also mounted on the recorder chassis. Both relays are hermetically-sealed units suitable for control room use. Switches 98 and 100 are operated by a lever 102 which is moved about a pivot point by the bow gear of the recorder. At the beginning of the standardization cycle, the programmer switches three-way solenoid valve 32 (in FIGURE 1) to divert scrubber effluent to the drain instead of through optical cell 36 (in FIGURE 1). Simultaneously, solenoid valve 56 (in FIGURE 1) operates admitting pure water to optical cell 36. Pure water flows through the cell for approximately 15 to 20 minutes, flushing out any suspended particles of catalyst. With pure water in cell 36, the programmer then switches power to microswitches 98 and 100 (in FIGURE 3). If the recorder pen is displaced from the base line when the cell is at equilibrium on pure water, the pen displacement is detected by either switch 98 or 100, depending whether the pen is above or below the base line. If a base line correction is required, either relay 94 or relay 96 will operate to apply power to motor 92 and produce clockwise or counter-clockwise rotation, respectively. Motor 92 will then drive the slider of potentiometer 70 to bring the recorder pen to the base line which has been established at ten percent of full-scale. The circuit will, therefore, correct for either positive or negative draft away from the base line. In normal operation, base line drift is rarely more than four or five percent of full-scale in an eight-hour period. This adjustment compensates for accumulation of dirt on the windows of the optical cell, changes in photocell characteristics, darkening of the light source, or deterioration of mirrors.

Resistors 84, 86 and 88 are used to establish base line on each range. When base line is established on range one by adjustment of resistors 66 and 84, the base line settings for ranges two and three are readily determined by adjusting sliders of potentiometers 86 and 88, respectively. Initially, the slider of potentiometer 84 should be set within about 75 percent of the "high" end. After sliders of 84, 86 and 88 have been properly set for base line with pure water in the cell, range switching will not cause shifts in the base line.

FIGURE 3 also shows associated elements which facilitate the operation of the circuit. An adjustable shutter 104 is provided between the light source 46 and photocell 44. Starting switch 106 causes relay 108 to lock in a pulled-in position. Warning light 109 is utilized to indicate when light source 46 has burned out.

In utilizing the apparatus the sampling probe 12 is located at a point in stack 10 which represents the average catalyst concentration. Calibration of the apparatus is accomplished by operating the apparatus at a constant gas rate and at different water rates. The reading from the apparatus is determined for each water rate and the readings represent corresponding catalyst concentrations in the water passing through cell 36.

The catalyst concentration is determined by filtering the catalyst from the water, drying and weighing. Each calibration should be timed in order to determine the total amount of gas passed through scrubber 14. About one hour is required for each measurement. Three to four measurements, each at different water rates, will usually suffice. From these data, the concentration of catalyst in the stack gas can be determined. It is convenient to express the catalyst concentration in terms of pounds of catalyst per pound of stack gas. Nominally, the molecular weight of stack gas is about 29.

As noted above in the explanation of FIGURE 1, the method is carried out by initially removing at a constant rate a sample of the stack gas from stack 10. The sample is then contacted with water from water flow regulator 18 in scrubber 14 to separate the particles from the gas sample and to produce aqueous suspension. The aqueous suspension then flows into optical cell 36 in which light is passed through the suspension and the amount of light received is detected. Lamp means 46 serves as a light source and photocell means 42 serves to receive the light. A comparison is made between the amount of light received through the suspension with a value for light received through water without the catalyst particles. Photocell means 44 conveniently serves to indicate the latter value. The comparison provides a measure of the catalyst particles in the gas sample and serves as a basis for calculating the rate of catalyst loss in the stack gas through the use of a determined relationship between the gas sample and the main stream of stack gas.

The amount of light received through water without catalyst particles is periodically and automatically redetermined to provide an improved accuracy in the above-described measurements. In this method water is fed from water storage 30 by means of line 54, which includes solenoid valve 56 and flow restrictor 58, into reservoir 34, and insures a complete column of liquid in cell 36. At the same time solenoid valve 32 by-passes the aqueous suspension around cell 36 by means of line 52. The electrical circuit for the light measurements is photocell bridge 40 which includes photocell 42 and 44.

Although I have described this invention by reference to specific embodiments, it is to be understood that this is by way of illustration only and that the invention is not limited thereto. Accordingly, it is contemplated that other apparatus can be devised employing the basic features of my invention without departing from the operation thereof, as described herein or as defined by the impending claims.

What I claim is:

1. An apparatus for continuously determining the concentration of solid particulate matter suspended in a carrier gas, said solid particulate matter comprising a finely divided solid with a varied particle size principally below about 20 microns, which apparatus comprises means for removing at a constant rate a sample of the carrier gas containing the particles of solid particulate matter, means for contacting the sample with water at a second constant rate to separate the particles from the gas sample and to produce an aqueous suspension, means for passing a light through the aqueous suspension and for detecting the amount of light received, means for comparing the light received through the aqueous suspension with the light received through the water without the particles of solid particulate matter, the comparison providing a measure of the amount of solid particulate matter in the gas sample.

2. The apparatus of claim 1 wherein said apparatus includes a means for periodically and automatically redetermining the light received through the water without particles to provide an improved accuracy in said comparison.

3. An apparatus for continuously determining the rate of particle loss from an exhaust gas containing particles of solid particulate matter, said particles comprising a finely divided solid with a varied particle size principally below about 100 microns, which apparatus comprises means for removing at a constant rate a sample of the exhaust gas containing the particles, means for contacting the sample with water at a second constant rate to separate the particles from the gas sample and to produce an aqueous suspension, means for passing a light through the aqueous suspension and for detecting the amount of light received, means for comparing the light received through the aqueous suspension with the light received through the water without particles, the comparison providing a measure of the amount of particles in the gas sample which can be used to calculate the amount of particle loss in the stack gas through a predetermined relationship between the sample and the stack gas which can be used to calculate the amount of particle loss in the exhaust gas through a predetermined relationship between the sample and the exhaust gas.

4. The apparatus of claim 3 wherein said apparatus includes means for periodically and automatically redetermining the light received through the water without particles to provide an improved accuracy in said comparison.

5. An apparatus for continuously determining the rate of catalyst loss in the stack gas from a regenerator on a fluid catalyst conversion unit, said particles comprising a finely divided solid with a varied particle size principally below about 20 microns, which apparatus comprises means for removing at a constant rate a sample of the stack gas containing the particles, means for contacting the sample with water at a second constant rate to separate the particles from the gas sample and to produce an aqueous suspension, means for passing a light through the aqueous suspension and for detecting the amount of light received, means for comparing the light received through the aqueous suspension with the light received through the water without particles, the comparison providing a measure of the amount of particles in the gas sample which can be used to calculate the amount of particle loss in the stack gas through a predetermined relationship between the sample and the stack gas.

6. The apparatus of claim 5 wherein said apparatus includes a means for periodically and automatically redetermining the light received through the water without particles to provide an improved accuracy in said comparison.

7. An apparatus for continuously determining the concentration of solid particulate matter suspended in a carrier gas which apparatus comprises a sample probe in communication with the carrier gas for obtaining a sample of the gas containing the solid particulate matter; a scrubber connected to the probe for receiving the sample at a constant rate; water means for passing water into the scrubber at a second constant rate to produce an aqueous suspension of the solid particulate matter; an optical cell connected to the scrubber and provided with light means and photocell means for respectively transmitting light through the aqueous suspension and for detecting the amount of light received; an electrical circuit connected to the photocell means for comparing the amount of light received through the aqueous suspension to a predetermined value of light received through water without the catalyst.

8. The apparatus of claim 3 wherein the connection between the scrubber and optical cell includes a level controller for providing a constant column of liquid between the light means and the photocell means, and a second water means connected by a switching means to the level controller for optionally passing water without the suspended solid particulate matter through the level controller and into the optical cell to redetermine the amount of light received through the water.

9. The apparatus of claim 4 wherein said apparatus includes means connected to the switching means for periodically and automatically operating the switching means.

10. The apparatus of claim 3 wherein the optical cell includes a mirror to reflect light from the light means to the photocell means to increase the light path.

11. An apparatus for continuously determining the rate of catalyst loss in the stack gas from a regenerator on a fluid catalytic conversion unit, which apparatus comprises a sample probe connected to the stack for obtaining a sample of the gas containing the catalyst; a scrubber connected to the probe for receiving the sample at a constant rate; water means for passing water into the scrubber at a second constant rate to produce an aqueous suspension of the catalyst; an optical cell connected to the scrubber and provided with light means and photocell means for respectively transmitting light through the aqueous suspension and for detecting the amount of light received; an electrical circuit connected to the photocell means for comparing the amount of light received through the aqueous suspension to a predetermined value of light received through water without the catalyst.

12. The apparatus of claim 7 wherein the connection between the scrubber and optical cell includes a level controller for providing a constant column of liquid between the light means and the photocell means, and a second water means connected by a switching means to the level controller for optionally passing water without catalyst particles through the level controller and into the optical cell to redetermine the amount of light received through the water.

13. The apparatus of claim 4 wherein said apparatus includes means connected to the switching means for periodically and automatically operating the switching means.

14. The apparatus of claim 3 wherein the optical cell includes a mirror to reflect light from the light means to the photocell means to increase the light path.

15. A method of continuously determining the concentration of solid particulate matter in a carrier gas, said solid particulate matter being finely divided with a varied particle size principally below about 100 microns, which method comprises removing, at a constant rate, a sample of the carrier gas containing suspended therein the solid particulate matter, contacting the sample with water at a second constant rate to separate the solid particulate matter from the gas sample and to produce an aqueous suspension, passing a light through the aqueous suspension and detecting the amount of light received, comparing the amount of light received through the aqueous suspension with a value for light received through water without the solid particulate matter, the comparison providing a measure of the amount of solid particulate matter in the carrier gas sample.

16. The method of claim 15 wherein the amount of light received through water without solid particulate matter suspended therein is periodically and automatically redetermined to provide an improved accuracy in the comparison with light received through aqueous suspension.

17. A method of continuously determining the rate of catalyst loss in the stack gas from a regenerator on a fluid catalytic conversion unit, said catalyst being a finely divided solid with a varied particle size principally below about 20 microns, which method comprises removing at a constant rate a sample of the stack gas containing the catalyst particles, contacting the sample with water at a second constant rate to separate the particles from the gas sample and to produce an aqueous suspension, passing a light through the aqueous suspension and detecting the amount of light received, comparing the amount of light received through the aqueous suspension with a value for light received through water without the catalyst particles, the comparison providing a measure of the amount of catalyst particles in the gas sample, and calculating the rate of catalyst loss in the stack gas through a determined relationship between the gas sample and the main stream of stack gas.

18. The method of claim 17 wherein the amount of light received through water without catalyst particles is periodically and automatically redetermined to provide an improved accuracy in the comparison with light received through the aqueous suspension.

References Cited

UNITED STATES PATENTS

| | | | |
|---|---|---|---|
| 2,299,529 | 10/1942 | Crampton | 210—96 |
| 2,962,926 | 12/1960 | Marak et al. | 250—218 X |
| 3,320,428 | 5/1967 | Wagstaffe et al. | 250—218 |

WALTER STOLWEIN, Primary Examiner

U.S. Cl. X.R.

210—96; 356—205

PO-1050
(5/69)

UNITED STATES PATENT OFFICE
CERTIFICATE OF CORRECTION

Patent No. 3,459,947            Dated August 5, 1969

Inventor(s) Wendell P. Cropper

It is certified that error appears in the above-identified patent and that said Letters Patent are hereby corrected as shown below:

Column 5, line 22, the word "draft" should read -- drift --.

Column 7, line 41, claim number "3" should read -- 7 --;

Column 7, line 50, claim number "4" should read -- 8 --;

Column 7, line 54, claim number "3" should read -- 7 --;

Column 8, line 1, claim number "7" should read -- 11 --;

Column 8, line 10, claim number "4" should read -- 12 --;

and Column 8, line 14, claim number "3" should read -- 11 --.

SIGNED AND
SEALED

OCT 21 1969

(SEAL)
Attest:

Edward M. Fletcher, Jr.
Attesting Officer

WILLIAM E. SCHUYLER, JR.
Commissioner of Patents